(12) United States Patent
Wijbenga

(10) Patent No.: US 6,536,157 B2
(45) Date of Patent: Mar. 25, 2003

(54) PORTABLE GREENHOUSE

(76) Inventor: Grietje Wijbenga, 10 Tenney Rd., West Orange, NJ (US) 07052

(*) Notice: Subject to any disclaimer, the term of this patent is extended or adjusted under 35 U.S.C. 154(b) by 0 days.

(21) Appl. No.: 09/737,594

(22) Filed: Dec. 18, 2000

(65) Prior Publication Data

US 2002/0073613 A1 Jun. 20, 2002

(51) Int. Cl.[7] .............................................. A01G 9/16
(52) U.S. Cl. ............................................................ 47/17
(58) Field of Search ............................ 47/17, 19.1, 19.2, 47/29.3, 18, 66.3, 66.5, 83, 61, 69

(56) References Cited

U.S. PATENT DOCUMENTS

| | | | | |
|---|---|---|---|---|
| 1,954,674 A | * | 4/1934 | Lager | 47/17 |
| 2,300,776 A | * | 11/1942 | Collins | 47/69 |
| 3,768,201 A | * | 10/1973 | Yoo | 47/16 |
| 4,233,779 A | * | 11/1980 | Griffith | 47/26 |
| 4,711,051 A | | 12/1987 | Fujimoto | |
| 4,850,135 A | | 7/1989 | DeMarco | |
| 5,025,589 A | * | 6/1991 | Park | 47/61 |
| 5,241,781 A | | 9/1993 | Malczyk | |
| 5,315,834 A | | 5/1994 | Garunts et al. | |
| 5,505,020 A | | 4/1996 | North | |
| 5,509,229 A | | 4/1996 | Thomasson et al. | |

FOREIGN PATENT DOCUMENTS

| | | | | |
|---|---|---|---|---|
| JP | 402299519 | * | 12/1990 | A01G/9/16 |
| JP | 405023056 | * | 2/1993 | A01G/9/16 |
| JP | 406343347 | * | 12/1994 | A01G/9/16 |

* cited by examiner

Primary Examiner—Peter M. Poon
Assistant Examiner—Son T. Nguyen
(74) Attorney, Agent, or Firm—Siemens Patent Services, LC

(57) ABSTRACT

A portable, minature greenhouse. The greenhouse is modular, having vertically stackable sections. The base section has a floor, wheels, and insulated upright walls having reflective interior surfaces. Subsequent sections have transparent walls. Optionally, at least one wall is slidably mounted to the greenhouse. An opaque, insulated lid covers the top section. The lid has openings enabling passage of air. The base and subsequent sections have slots formed in their walls for receiving slats placed therein in spaced apart relation. The slats form shelves of selectively variable width. The greenhouse has at least one light and reflective hood mounted in the lid, a timer disposed to control the light, a water supply conduit, forced air ventilation, an air filter which in alternative embodiments has an activated carbon element or a HEPA element, and an air ionizer.

14 Claims, 4 Drawing Sheets

PORTABLE GREENHOUSE

BACKGROUND OF THE INVENTION

1. Field of the Invention

The present invention relates to structures for supporting and nurturing potted plants. More particularly, the invention sets forth a modular, adjustably configured portable greenhouse. The novel greenhouse is useful for growing and displaying individual plants and small groups of plants. It is most advantageously used in residences, commercial, office, and institutional spaces wherein it is desired to grow plants, but which spaces are not conducive to providing specialized needs of plants.

2. Description of the Prior Art

Greenhouses have been employed for a very long time for providing suitable growing environments for plants. A greenhouse can maintain temperatures and humidity in ranges suitable for nurturing plants which could otherwise not flourish in occupied places far from the native habitat of the plants. In particular, it has become popular to grow exotic plants at home, in offices, commercial spaces, and other artificial environments. The desire to grow plants has resulted in miniaturized greenhouses to be developed.

An example is seen in U.S. Pat. No. 5,315,834, issued to Feliks Garunts et al. on May 31, 1994. The subject device of this patent comprises an insulated cabinet having a fan for forced ventilating, an air ionizer, and illumination in one of its several sections. By contrast, the present invention comprises a cabinet which is readily separable into detachable modules, and which features built up shelves which may be varied in width. Other features of the present invention not seen in Garunts et al. include wheels, reflective interior surfaces, and air filters.

A greenhouse intended to contain a single plant is shown in U.S. Pat. No. 5,505,020, issued to Keith North on Apr. 9, 1996. North's device comprises an inverted cup having an opening in the top. A closure which closes this opening has a smaller opening which in turn has a closure. The opening is thus variable in area, depending upon which closures are assembled to the base. North lacks separable modules of equal area, variable width shelves, wheels, reflective interior surfaces, forced ventilation, and air filter and ionizer, all of which are features of the present invention.

A nestable miniaturized greenhouse is seen in U.S. Pat. No. 4,711,051, issued to Sachi M. Fujimoto on Dec. 8, 1987. The subject greenhouse comprises a plurality of frustoconical receptacles lacking separable modules of equal area, variable width shelves, wheels, reflective interior surfaces, forced ventilation, and air filter and ionizer, as seen in the present invention.

U.S. Pat. No. 4,794,727, issued to Kevin J. Smith on Jan. 3, 1989, describes a wheeled greenhouse. Smith lacks the vertically stackable, separable modules, variable width shelves, wheels, reflective interior surfaces, forced ventilation, and air filter and ionizer of the present invention.

U.S. Pat. No. 4,850,135, issued to Jeffery J. DeMarco on Jul. 25, 1989, shows a small plant enclosure having lighting and ventilation. However, the ventilation is not forced, as in the present invention. The device of DeMarco lacks separable modules, variable width shelves, wheels, reflective interior surfaces, air filter, and ionizer, as seen in the present invention.

A plant enclosure shown in U.S. Pat. No. 5,241,781, issued to Thomas R. Malczyk on Sep. 7, 1993, provides a forced water supply and lighting. Malczyk lacks separable modules, variable width shelves, wheels, reflective interior surfaces, forced ventilation, and air filter and ionizer, as seen in the present invention.

A modular enclosure for plants is shown in U.S. Pat. No. 5,509,229, issued to Joseph R. Thomasson et al. on Apr. 23, 1996. However, the modules of Thomasson et al. increase the area of the enclosure. By contrast, modular rearrangement in the present invention selectively increases overall height and the number of available shelves. Thomasson et al. lacks shelves, wheels, reflective interior surfaces, forced ventilation, and air filter and ionizer, all of which are provided in the present invention.

None of the above inventions and patents, taken either singly or in combination, is seen to describe the instant invention as claimed.

SUMMARY OF THE INVENTION

The present invention provides a versatile, portable greenhouse which is readily reconfigured to suit different plants being housed therein and different external conditions. The novel greenhouse is formed in separable modular sections which are vertically stackable. A lid covers the uppermost module. One significant adjustable characteristic arising from modular construction is that of depth. Different levels for supporting potted plants are created by variable width shelves which are supported on each of the modules. The lowermost module has wheels, so that the greenhouse can be wheeled about to different locations within a room or living space, to have access to water and electrical power, and to be located advantageously for viewing.

The modules are readily installed and removed. No tools are required for accomplishing this. The variable width shelves are provided by removable slats which span opposed walls of the modules, therefore also being readily installed and removed. The modules optionally include doors which swing open about a vertical axis of rotation, and vertically sliding wall panels.

The novel greenhouse has many features for promoting plant growth. Temperature is maintained by insulation and by reflective internal surfaces of the lowermost module and of the lid. Optionally, reflective coatings are provided to transparent walls of the greenhouse. Openings formed in the lid afford a measure of control of temperature rise. The greenhouse is provided with a water supply system, lighting, and a forced air ventilation system. The ability of the greenhouse to nurture plant growth is thus not dependent upon exposure to the natural environment, and may even succeed in the total absence of natural light. Air is filtered by an activated carbon or high efficiency particulate arresting (HEPA) filter, and is charged by an ionizer.

The novel portable greenhouse is suited for growing different types of plants and is adaptable for use in conditions not conducive to plant growth. Modular construction enables the overall height of the greenhouse to be adjusted according to the height of plants contained therein. Width and location of shelves offers accommodation of location, height, and number of potted plants contained in the greenhouse. Overall dimensions of the novel greenhouse assure that it is compatible with homes, offices, and other living spaces and workplaces of limited area. The plant nurturing features built into the greenhouse render the greenhouse an ideal, self-contained environment for growing plants in living spaces and workplaces that are not inherently favorable for nurturing plants.

Accordingly, it is one object of the invention to provide a portable greenhouse which is highly suitable for use in living spaces and workplaces that lack amenities favoring plant growth.

It is another object of the invention that the greenhouse be portable and self-contained.

It is a further object of the invention to control temperatures within the plant growing area.

Still another object of the invention is to provide light and water to nurture growing plants.

An additional object of the invention is to filter air passing through the greenhouse.

It is another object of the invention to ionize air within the greenhouse.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
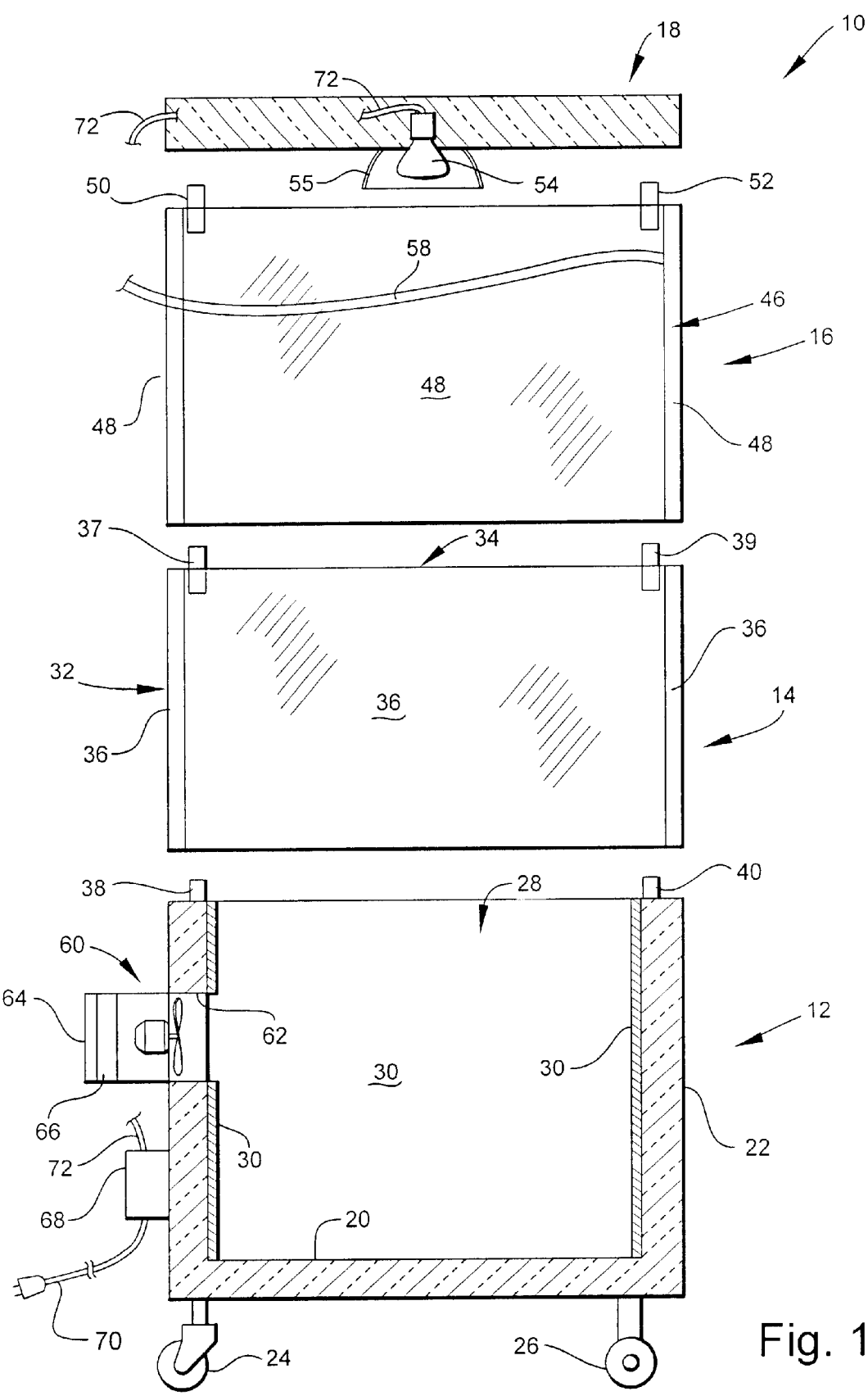
FIG. 1 is an exploded, side elevational view of an embodiment of the invention, shown partially in cross section.

Turning now to FIG. 1 of the drawings, an embodiment of the novel portable, miniature greenhouse is indicated generally by reference numeral 10. Greenhouse 10 is formed in vertically stackable modules including a base module 12, a first intermediate module 14, a second intermediate module 16, and a lid 18. Base module 12 is that module which rests on a floor (not shown) or other horizontal environmental surface. Base module 12 has a floor 20, an upstanding perimetric wall 22 projecting from floor 20, and wheels 24, 26 fixed to base module 12. An interior 28 having a closed bottom and an open top is formed within wall 22. Floor 20 and wall 22 of base module 12 are formed from an insulating material such as glass wool, closed cell expanded synthetic foam, a material formed to enclose pockets of air, or a natural material such as perlite having similar insulating characteristics. Wall 22 has internally exposed surfaces bounding interior 28 covered by a reflective material such as aluminum foil 30.

First intermediate module 14 has an upstanding perimetric wall 32 enclosing an interior 34 open at the bottom and at the top. Wall 32 has at least one transparent panel 36. In the embodiment of FIG. 1, wherein modules 12, 14, 16 are generally parallelepipeds, wall 32 comprises four transparent panels. Intermediate module 14 engages base module 12 by connecting elements 38, 40 which prevents module 14 from sliding out of engagement with base module 12 by interference. Connecting elements 38, 40 each comprise a molding strip which projects upwardly from wall 22 of base module 12. Panels 36 of wall 32 of module 14 are located such that when module 14 is placed onto base module 12 from above, panels 36 collectively encircle connecting elements 38, 40. Preferably, at least one panel 36 is arranged to slide along guides (such as grooves shown in FIGS. 4 and 5) formed in modules 14, thereby exposing the interior of module 14. The guides may be similar to those of conventional slidable windows of buildings, display cabinets, and the like. Panels 36 come to rest on wall 22 of base module 12, and are dimensioned and configured to engage base module 12 and retain module 14 thereon. Module 14 is readily lifted upwardly out of engagement with base module 12.

Figure 2:
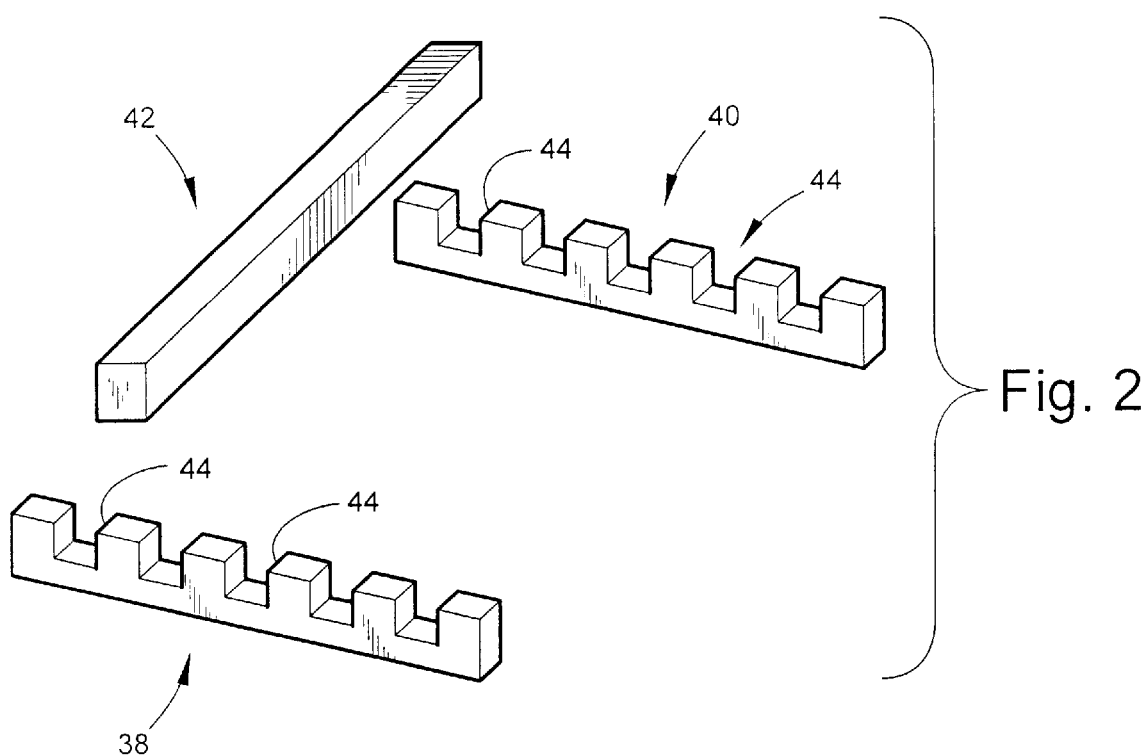
FIG. 2 is a perspective detail view of elements which interengage the major components shown spaced apart from one another in FIG. 1.

Turning momentarily to FIG. 2, connecting elements 38, 40 are seen to comprise castellated or slotted moldings collectively forming a holder dimensioned and configured to support and retain slats (only one slat 42 is shown, and is typical of all of the slats) therein above wall 22 in spaced apart, generally parallel relation to one another. Each slot 44 is dimensioned and configured to loosely receive a slat 42. Slats are therefore readily placed onto and lifted from connecting elements 38, 40. The slats collectively form a shelf on which potted plants (not shown) may be rested. Spacing of slats promotes air circulation and ventilation by convection currents. Any number of slats may be placed into the holder, so that width of the shelf is selectively variable.

Referring again to FIG. 1, first intermediate module 14 is preferably dimensioned and configured to overlie base module 12. Connector elements 37, 39 are similar in construction to connector elements 38, 40 of base module 12.

Second intermediate module 16 is generally similar in construction to module 14, having an upstanding perimetric wall 46 including at least one and preferably a plurality of transparent panels 48, connection elements 50, 52 similar to those of modules 12 and 14, and slats (not shown, but similar to slat 42 of FIG. 2) for forming a shelf on module 16. Connection elements 50, 52 form a holder dimensioned and configured to support and retain slats on second intermediate module 16. Module 16 is supported in overlying relation above module 14 by connector elements 37, 39 of module 14.

The open interiors of respective modules 12, 14, 16 collectively form a receptacle for containing potted plants. This receptacle may be open and unobstructed if no slats are placed in the holders formed by connector elements 38, 40 or 37, 39, or 50, 52. Alternatively, module 12 or 14 or both may have a shelf. The shelves may be of full width, wherein each slot formed in the connector elements receives a slat, so that the resultant shelf covers the entire area of the interior of its associated module 12 or 14. Optionally, any of the slots may be provided with a slat, so that the shelves so formed are selectively variable as to width. The shelves are also selectively located. That is, a shelf of less than full width may overlie a similar shelf formed in the module below. Alternatively, the shelves could be staggered to generate a stair step visual effect when viewed from the side. The various shelf arrangements enable different arrangements of potted plants, with attendant variations in esthetic effect.

Figure 3:
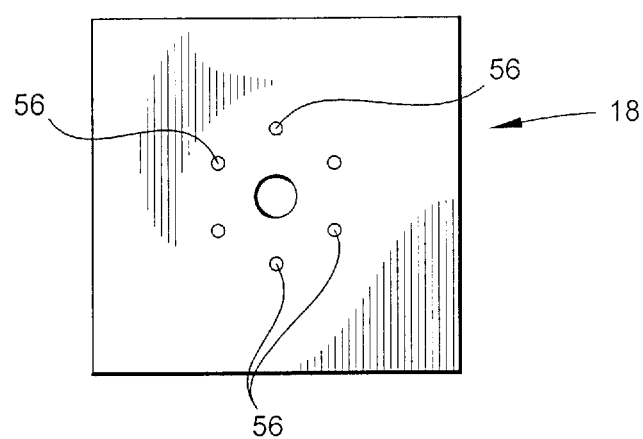
FIG. 3 is a top plan view of FIG. 1.

Lid 18 is dimensioned and configured to cover any of base module 12, first intermediate module 14, and second intermediate module 16. Lid 18 includes insulating material in a manner similar to that of base module 12. Greenhouse 10 is preferably provided with a lamp 54 disposed to project light into the receptacle formed by the open interiors of modules 12, 14, 16. A reflective hood 55 directs light downwardly. It will be appreciated that a further benefit of spacing apart of the slats forming the shelves is that some light will pass to the lowermost portions of plants contained within base module 12. Lamp 54 is supported on lid 18 in a location assuring that light will be projected downwardly into the receptacle. As seen in FIG. 3, lid 18 has a plurality of openings 56 extending from the upper surface of lid 18 to the lower surface thereof. Openings 56 promote air flow through lid 18. Air flow limits temperature build up in the vicinity of lamp 54.

Greenhouse 10 includes the following amenities for promoting plant growth. Module 16 has a conduit 58 for discharging water over the receptacle. Conduit 58 may be a perforated hose or alternatively could be a wick. Conduit 58 is connected to a suitable supply of water (not shown), such as a storage vessel located high enough to supply water by gravity, to a small water pump, for example of the type used to circulate water in a fish aquarium, or to any suitable supply of pressurized water.

A fan 60 having an electric motor is mounted on base module 12 at an opening 62 formed in wall 22, so that fan 60 can propel air through the receptacle of greenhouse 10. An air filter 64 is disposed to filter air passing into the receptacle. In alternative embodiments, air filter 64 has an activated carbon filtration element (not separately shown), a high efficiency, particulate arresting filtration element (not separately shown), or any other effective air filtering element. An air ionizer 66 is disposed to generate ions within air contained within greenhouse 10.

A timer 68 is provided for controlling power conducted to lamp 54. Timer 68 may be of any commercially available type which is manually adjustable to close and open a power circuit at respective predetermined times. Power is derived from a plug and cord assembly 70, and is conducted to lamp 54 by conductors 72.

Figure 4:
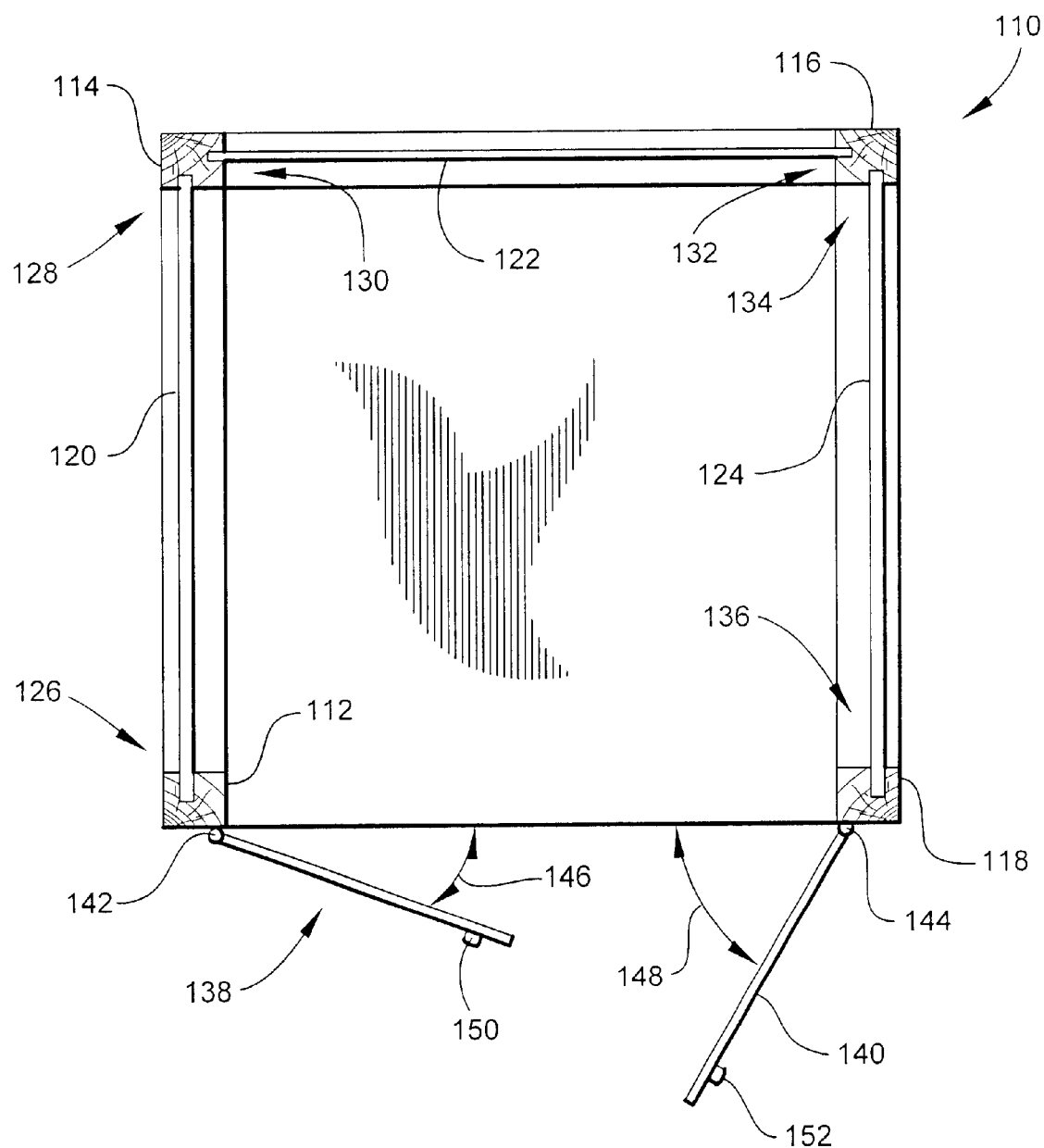
FIG. 4 is a top plan view of an alternative embodiment of the invention, illustrating removable side windows and swinging doors.

FIG. 4 shows an alternative embodiment which is open, in that it affords observers both visual and physical access to the interior. The perimetric wall of greenhouse 110 include a plurality of posts 112, 114, 116, 118 each located at one corner of the perimetric wall. Each post 112, 114, 116, or 118 has one vertically oriented groove formed in at least one face thereof, for slidably receiving a removable, transparent window panel 120, 122, or 124 therein. Panels 120, 122, 124 are preferably formed from glass and more preferably from an acrylic plastic. Each panel 120, 122, or 124 is dimensioned and configured to be manually insertable into and removable from two of grooves 126, 128, 130, 132, 134, 136 of adjacent ones of posts 112, 114, 116, 118.

The embodiment of FIG. 4 also includes two transparent swinging doors 138, 140 pivotally supported on associated hinges 142, 144. Hinges 142, 144 are arranged such that their associated doors 138, 140 swing about vertical axes. Door swing is indicated by arrows 146, 148. Doors 138, 140 each include handles or door pulls 150, 152 fixed thereto.

Figure 5:
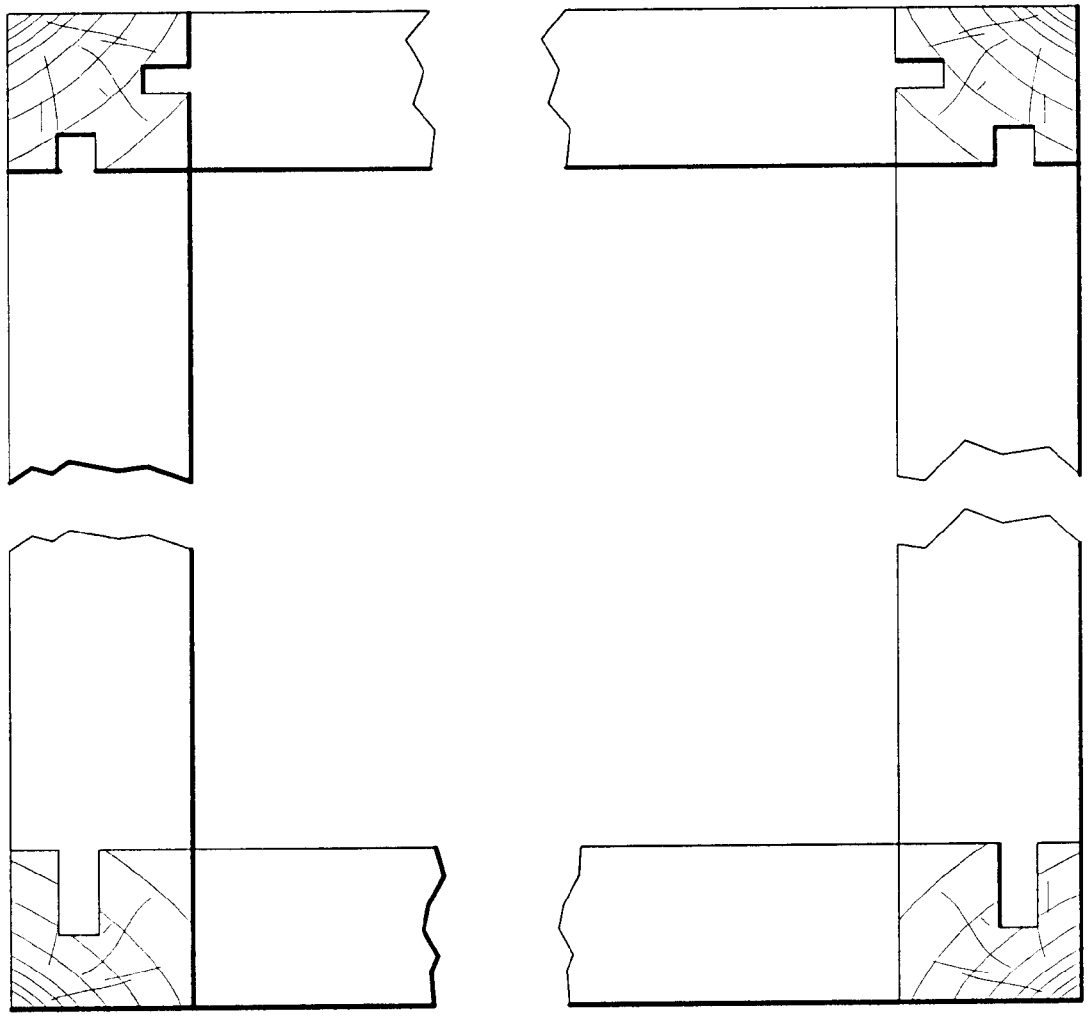
FIG. 5 is a top plan detail view of another alternative embodiment of the invention.

FIG. 5 shows an embodiment of the invention wherein grooves are seen in detail, with window panels removed for clarity. The embodiments of FIGS. 4 and 5, while they may have proportions of the embodiment of FIG. 1, preferably are considerably taller than they are wide and deep. Each side of the greenhouses of FIGS. 4 and 5 preferably has a plurality of window panels, so that the overall height of each window panel is not objectionably large and unwieldy.

It has been found that suitable dimensions for modules of the embodiment of FIG. 1 include height of two feet, width of two and one half feet, and depth of fifteen inches. Heights of the modules of the embodiments of FIGS. 4 and 5 are on the order of three to five feet.

The present invention is susceptible to variations and modifications which may be introduced thereto without departing from the inventive concept. For example, location of lamp 54, water conduit 58, fan 60, air filter 64, air ionizer 66, and timer 68 may be located other than as described herein. Fan 60, air ionizer, and even an electric pump (not shown), if one is provided for pressurizing water supplied to conduit 58, may be connected to power controlled by timer 68. More than one lamp 54 may be provided if desired.

In further examples, the number of intermediate modules may be increased beyond the two described herein. Also, the connector elements may be reversed in their locations to project downwardly from lid 18 and intermediate modules 14, 16, in place of projecting upwardly, if desired.

In still further examples, swinging doors and removable window panels shown in FIGS. 4 and 5 may be incorporated into any of the other embodiments.

It is to be understood that the present invention is not limited to the embodiments described above, but encompasses any and all embodiments within the scope of the following claims.

I claim:

1. A modular portable greenhouse capable of vertical height extension, thus selectively increasing overall height of said greenhouse comprising:

a base module having a floor, an upstanding perimetric wall, having equilateral sides, projecting from said floor, and an interior having a closed bottom and an open top formed within said perimetric wall, being free of any partitions, and wherein said perimetric wall of said base module further has an opening within said wall containing a fan mounted therein through said greenhouse, wherein said fan blows directly into the interior of said base module without circulating through any partition, and further comprising reflective means on the interior surface of said base module, and said base module further comprising an automatic power means affixed thereto;

a first intermediate module having an upstanding perimetric wall enclosing an interior, forming an open bottom and top, wherein said first intermediate module includes at least one transparent panel, a connection element dimensioned and configured to engage said base module and retain said first intermediate module on said base module, said connection element further includes a plurality of slats, and a holder dimensioned and configured to support and retain said slats above said perimetric wall of said first intermediate module; and a lid dimensioned and configured to cover said first intermediate module, wherein said lid further comprises a lamp disposed therein to project light into said greenhouse; and said automatic power means including a timer and a responsive power circuit, said circuit providing power to said lamp, and wherein said timer actuates said responsive power circuit at predetermined times corresponding to power on and off times of said lamp;

wherein said base module and said first intermediate module collectively form a receptacle for containing potted plants; and wherein a second intermediate module having an upstanding perimetric wall, forming an open top and open bottom, including at least one slidably mounted transparent panel, a connection element dimensioned and configured to engage said first intermediate module and retain said second intermediate module on said first intermediate module, said connection element further includes a plurality of slats, and a holder dimensioned and configured to support and retain said slats above said perimetric wall of said second intermediate module.

2. The greenhouse according to claim 1, wherein said perimetric wall of said base module includes insulating material.

3. The greenhouse according to claim 1, wherein said lid includes insulating material.

4. The greenhouse according to claim 1, wherein said base module has a plurality of wheels disposed to enable said base module to be rolled across horizontal environmental surfaces.

5. The greenhouse according to claim 1, wherein said lid has a plurality of openings for promoting air flow through said lid.

6. The greenhouse according to claim 1, further comprising an air filter disposed to filter air passing through said greenhouse.

7. The greenhouse according to claim 6, wherein said air filter has an activated carbon filtration element.

8. The greenhouse according to claim 6, wherein said air filter has a high efficiency, particulate arresting filtration element.

9. The greenhouse according to claim 1, further comprising an air ionizer disposed to generate ions within air contained within said greenhouse.

10. The greenhouse according to claim 1, wherein said holder is disposed to hold said slats in spaced apart, substantially parallel relation to one another.

11. The greenhouse according to claim 1, further comprising a water distribution conduit disposed to discharge water over said greenhouse.

12. The greenhouse according to claim 1, wherein at least one of said base module and said first intermediate module has at least one swinging door and a hinge disposed to cause said swinging door to swing about a vertical axis.

13. The greenhouse according to claim 1, wherein at least one of said base module and said first intermediate module has a plurality of posts each located at one corner of said perimetric wall, and each said post has at least one vertical groove, and said greenhouse includes at least one removable, transparent panel dimensioned and configured to be slidably received within two of said grooves of adjacent said posts.

14. A modular portable greenhouse capable of vertical height extension, thus selectively increasing overall height of said greenhouse comprising:

a base module having a floor, an upstanding perimetric wall, having equilateral sides, projecting from said floor, and a plurality of wheels disposed to enable said base module to be rolled across horizontal environmental surfaces, wherein said perimetric wall of said base module has an opening formed therein, and includes insulating material and has internally exposed surfaces and a reflective material covering said internally exposed surfaces, and an interior having a closed bottom and an open top formed within said perimetric wall, being free of any partitions, and wherein said fan blows directly into the interior of said base module without circulating through any partition, and further comprising reflective means on the interior surface of said base module; and a first intermediate module having an upstanding perimetric wall enclosing an interior, forming an open bottom and top, wherein said first intermediate module includes at least one transparent slidably mounted panel, a connection element dimensioned and configured to engage said base module and retain said first intermediate module on said base module, said connection element further includes a plurality of slats, and a holder dimensioned and configured to support and retain said slats above said perimetric wall of said first intermediate module in spaced apart, generally parallel relation to one another;

a second intermediate module having an upstanding perimetric wall with equilateral sides, forming an open top and an open bottom, including at least one transparent panel, a connection element dimensioned and configured to engage said first intermediate module and retain said second intermediate module on said first intermediate module, a plurality of slats, and a holder dimensioned and configured to support and retain said slats above said perimetric wall of said second intermediate module;

a lid dimensioned and configured to cover said first intermediate module, wherein said lid includes insulating material and has a plurality of openings for promoting air flow through said lid and a lamp supported on said lid in a location to project light downwardly into said greenhouse;

a timer disposed to connect a power circuit and disconnect the power circuit to said lamp at predetermined times;

a fan mounted within said opening formed in the perimetric wall of the base module having an electric motor, wherein said fan is disposed to propel air through said greenhouse;

an air filter disposed to filter air passing through said greenhouse;

an air ionizer disposed to generate ions within air contained within said greenhouse;

a water distribution conduit disposed to discharge water over said greenhouse, wherein said base module and said first intermediate module collectively form a receptacle for containing potted plants, wherein at least one of said base module and said first intermediate module has at least one swinging door and a hinge disposed to cause said swinging door to swing about a vertical axis, and at least one of said base module and said first intermediate module has a plurality of posts each located at one corner of said perimetric wall, and each said post has at least one vertical groove, and said greenhouse includes at least one removable, transparent panel dimensioned and configured to be slidably received within two of said grooves.

* * * * *